May 21, 1957   J. H. WERNIG   2,793,070
WEATHERSTRIP SEAL FOR AUTOMOBILE REAR COMPARTMENT
Filed Nov. 16, 1953

INVENTOR
James H. Wernig
BY
Paul Fitzpatrick
ATTORNEY

United States Patent Office 2,793,070
Patented May 21, 1957

2,793,070

WEATHERSTRIP SEAL FOR AUTOMOBILE REAR COMPARTMENT

James H. Wernig, Bloomfield Village, Mich., assignor to General Motors Corporation, Detroit, Mich., a corporation of Delaware Application November 16, 1953, Serial No. 392,157

5 Claims. (Cl. 296—76)

This invention relates to a sealing construction, and more particularly to a sealing construction for the rear deck compartment of an automobile.

Almost all present day passenger automobiles have a deck compartment in the rear body panel, this compartment having a hinged deck lid. The compartment opening does not lie in a simple level plane, but is curved and has portions which face a substantially horizontally plane, portions which face in planes curving toward the vertical, and portions which face a substantially vertical plane. Because of this curvature it has been difficult to provide a simple and efficient seal for the deck lid compartment, and in some sealing constructions which have been used in the past two sealing weatherstrips have been used, one being fastened on the automobile body and the other being secured to the deck lid. Each of these sealing weatherstrips covers a different portion of the periphery of the deck lid opening and they are so arranged that a rain trough is provided in the body panel.

This invention provides an improved sealing construction wherein a single resilient weatherstrip is mounted on the body panel and extends all the way around the periphery of the deck lid opening. The weatherstrip is of constant transverse section throughout its length, thereby making for economy in manufacture and installation, only a single tool being required to install the weatherstrip on the body. Furthermore, the weatherstrip is of a cantilever type as contrasted with a compression type, and a curved flexible lip on the weatherstrip is engaged and deflected by a peripheral flange on the deck lid during closing movement of the deck lid. This construction is advantageous in that less force is required to make a good seal than is required with a compression type weatherstrip. Furthermore, the curved lip presents a relatively flat side of broad surface area which bears against the metal surface of the inner panel of the deck lid flange so that it is not necessary to depend upon a seal of small area which might be broken by the hemming flange at the edge of the deck lid.

The weatherstrip is mounted in a channel formed in a retaining member which is secured to the underside of the body panel. The construction greatly simplifies the manufacture of the body panel, which is formed with a depressed ledge instead of with a channel for the weatherstrip. In addition to simplifying the stamping of the panel this construction facilitates metal finishing at the weld joints of the body panel. Also, the retainer may be made in several pieces and may be overlapped at the joint in such a manner that no water traps are provided at the higher levels along the periphery of the deck lid opening. In other words, the several sections of the retainer may be "shingled" to avoid the presence of water traps.

The retainer has a mounting flange portion which is secured by welding or other conventional means on the underside of the depressed ledge on the body panel, and this flange is wider than the ledge portion of the body panel and extends away from the opening past the edge of the ledge to accommodate variations in width of the ledge at different locations around the periphery of the deck lid opening. This simplifies the construction despite variations in dimensions at different points around the opening.

Other features and advantages of the invention will be apparent from the following specification and drawings, in which.

Figure 1:
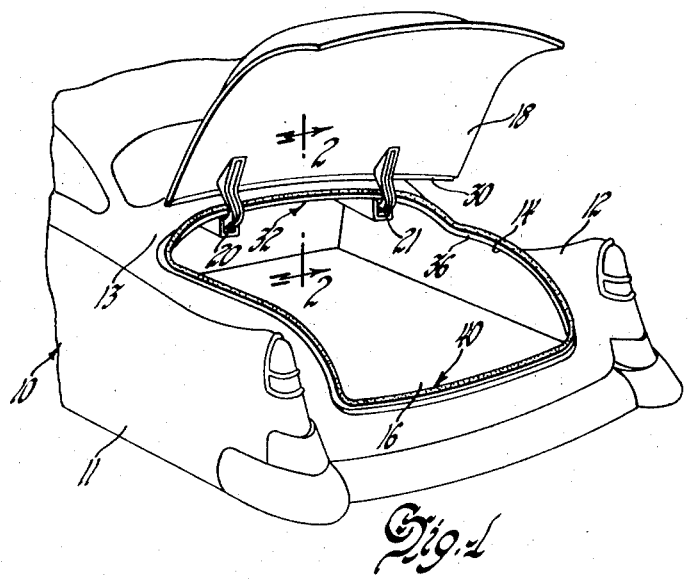
Fig. 1 is a fragmentary rear perspective view of an automobile having the improved sealing construction.

Referring now more particularly to the drawings, an automobile 10 has opposite rear fenders 11 and 12 between which is a rear deck panel 13. Panel 13 has an opening 14 therein to provide access to a rear deck compartment 16, and a closure member or lid 18 for this opening is mounted on the body by means of hinges 20 and 21.

Figure 2:
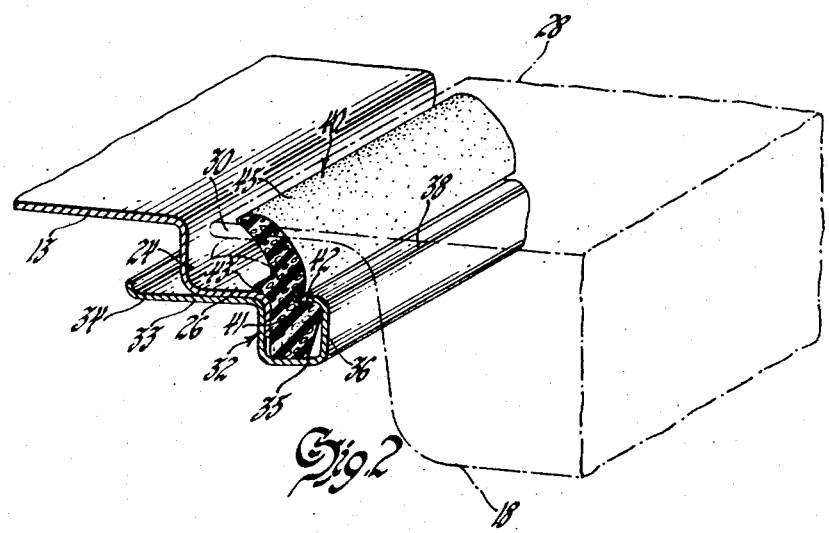
Fig. 2 is a section taken along the line 2—2 of Fig. 1, the weatherstrip being shown in solid lines in its free position when the deck lid is open and being shown in broken lines in its deflected position when the deck lid is closed.
Figure 3:
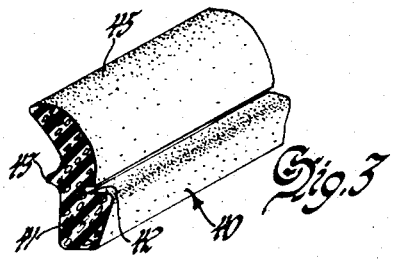
Fig. 3 is a view of a piece of the weatherstrip.

The details of the sealing arrangement are shown in Fig. 2. The rear deck body panel 13 is formed with an offset flange 24 and a depressed ledge portion 26 extending around the opening 14 adjacent the periphery thereof. The lid or closure member 18 has a peripheral flange 28 which overlies the ledge 26 when the opening is closed by the lid 18. The lid 18 has inner and outer panels, as is conventional, these panels being secured together by a hemming flange 30 at the edge of the lid.

With the improved sealing construction it is not necessary to form a channel in the edge of the body panel 13, and consequently both the panel forming stamping operation and the subsequent finishing operations are simplified.

The metal construction is completed by a retainer 32 having a mounting flange 33 secured (as by welding) to the underside of the depressed ledge 26. As shown at 34, the mounting flange 33 extends away from the deck lid opening 14 past the edge of the depressed ledge 26 to accommodate variations in width of the ledge 26 at different locations around the periphery of the deck lid opening 14. The retainer is also formed with a channel portion 35 which extends around the periphery of the deck lid opening 14 inwardly of the inner margin of the depressed ledge 26, the open side of the channel facing the plane of the deck lid opening 14. The channel portion of the retainer has an inner wall 36 which is provided with a peripheral flange 38 projecting toward the ledge 26 and into the open face of the channel.

A rubber weatherstrip designated generally as 40 has a base portion 41 which seats in the retainer channel and which may be cemented therein, a slot 42 which receives the peripheral flange 38 of the retainer, a foot 43 which engages and overlies the periphery of the ledge 26, and a flexible lip 45 which overlies the depressed ledge 26. As shown in Fig. 2, when in free position the lip 45 is curved toward the body panel 13 so that the closure flange 28 engages the flat side of the lip during closing movement of the lid 18 rather than engaging the knife-like edge of the lip. Consequently the flange 28 of the deck lid seals over a relatively large area of the lip 45 and this large area engages a smooth metal surface on the underside of the flange as shown in Fig. 2, so that a good seal is provided and it is not necessary in this construction to depend upon a seal of small area which might be interrupted by engagement with the hemming flange 30, of the deck lid peripheral flange. Preferably, the weatherstrip 40 extends in a single piece entirely around the periphery of the deck compartment opening 14.

As shown in Fig. 2, the depressed ledge 26 is exposed and forms the bottom of a rain trough which extends entirely around the periphery of the deck lid opening, one side of this trough being formed by the offset flange 24 of the body panel and the other side of the trough being formed by the lip 45 of the weatherstrip. Should any water leak past the weatherstrip it will not remain in the weatherstrip channel, but will be led off to the bottom edge of the deck lid opening where an outlet opening may be provided. The "shingle" type assembly of the several retainer strips avoids any water traps which would permit accumulation of water and the consequent deterioration of the rubber weatherstrip and metal channel.

While I have shown and described one embodiment of my invention, it is subject to many modifications. Changes, therefore, in the construction and arrangement may be made without departing from the spirit and scope of the specification as set forward in the appended claims.

I claim:

1. Apparatus of the character described, including: a body panel with an opening therein, said panel having a depressed ledge portion extending around the opening adjacent the periphery thereof; a closure member for said opening, said member having a peripheral flange which overlies said ledge when the opening is closed; a retainer having a mounting flange secured to the underside of said ledge and a channel portion extending around the periphery of said opening inwardly of the inner margin of said ledge, the open side of the channel facing the plane of said opening; and a weatherstrip having a base portion mounted in said channel, a foot overlying and engaging the periphery of said ledge, and a flexible lip overlying said ledge, said closure member flange engaging said lip and deflecting it toward said ledge when the opening is closed, and said ledge forming the bottom of a rain trough and said lip forming one side thereof.

2. Apparatus of the character claimed in claim 1, wherein said lip, when in free position, is curved toward the body panel, the closure member flange engaging the flat side of the lip during closing movement of the closure member.

3. Apparatus of the character described, including: a body panel with an opening therein, said panel having a depressed ledge portion extending around the opening adjacent the periphery thereof; a closure member for said opening, said member having a peripheral flange which overlies said ledge when the opening is closed; a retainer having a mounting flange secured to the underside of said ledge and a channel portion extending around the periphery of said opening inwardly of the inner margin of said ledge, the flange on the retainer member extending away from the opening past the edge of the ledge to accommodate variations in width in said ledge at different locations around the periphery of said opening, the open side of the channel facing the plane of said opening and the channel portion of the retainer having a peripheral flange projecting from its inner wall into the face of said channel and toward said ledge; and a rubber weatherstrip having a base portion mounted in said channel, a slot receiving the retainer peripheral flange, a foot engaging the periphery of said ledge, and a flexible lip overlying said ledge, said lip, when in free position, being curved toward the body panel and the closure member flange engaging the flat side of the lip during closing movement of the closure member.

4. Apparatus of the character described, including: a body panel with an opening therein, said panel having a depressed ledge portion extending around the opening adjacent the periphery thereof; a closure member for said opening, said member having a peripheral flange which overlies said ledge when the opening is closed; a retainer having a mounting flange secured to the underside of said ledge and a channel portion extending around the periphery of said opening inwardly of the inner margin of said ledge, the open side of the channel facing the plane of said opening, and the mounting flange on the retainer extending away from the opening past the edge of said ledge to accommodate variations in width in said ledge at different locations around the periphery of said opening; and a weatherstrip having a base portion mounted in said channel, a foot engaging the periphery of said ledge, and a flexible lip overlying said ledge, said closure member flange engaging said lip and deflecting it toward said ledge when the opening is closed, and said ledge forming the bottom of a rain trough and said lip forming one side thereof.

5. Apparatus of the character described, including: a body panel with an opening therein, said panel having a depressed ledge portion extending around the opening adjacent the periphery thereof; a closure member for said opening, said member having a peripheral flange which overlies said ledge when the opening is closed; a retainer having a mounting flange secured to the underside of said ledge and a channel portion extending around the periphery of said opening inwardly of the inner margin of said ledge, the open side of the channel facing the plane of said opening, the mounting flange on the retainer extending away from the opening past the edge of the ledge to accommodate variations in width in said ledge at different locations around the periphery of said opening; and a weatherstrip having a base portion mounted in said channel and a flexible lip overlying said ledge, said closure member flange engaging said lip and deflecting it toward said ledge when the opening is closed.

References Cited in the file of this patent

UNITED STATES PATENTS

| | | |
|---|---|---|
| 2,528,264 | Coppock | Oct. 31, 1950 |
| 2,603,528 | Higbie | July 15, 1952 |
| 2,622,286 | Beck | Dec. 23, 1952 |
| 2,647,792 | Flemming | Aug. 4, 1953 |
| 2,674,487 | Wernig | Apr. 6, 1954 |